(No Model.) 2 Sheets—Sheet 1.
J. M. LANDES.
AGRICULTURAL IMPLEMENT.
No. 354,324. Patented Dec. 14, 1886.
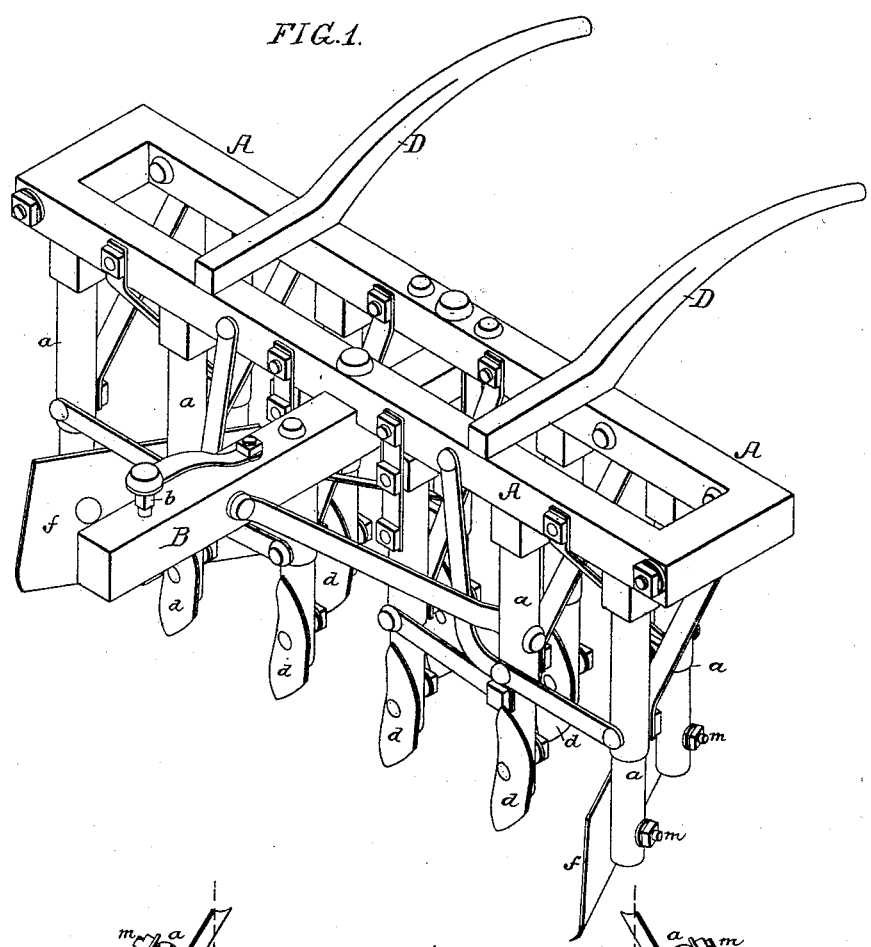
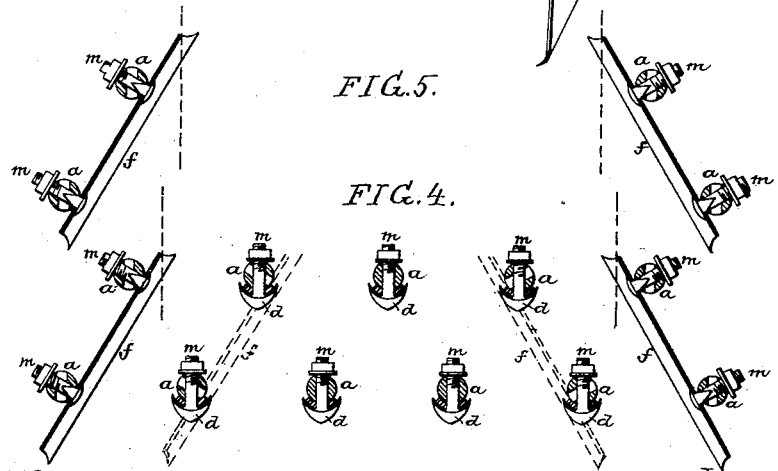
Witnesses:
William J Davis
Hamilton Q. Turner
Inventor:
Jacob M. Landes
by his Attorneys
Howson & Son (No Model.) 2 Sheets—Sheet 2.

J. M. LANDES.
AGRICULTURAL IMPLEMENT.

No. 354,324. Patented Dec. 14, 1886.

Witnesses:
William F. Davis
Hamilton D. Turner

Inventor:
Jacob M. Landes
by his Attorneys:
Howson & Son

UNITED STATES PATENT OFFICE.

JACOB M. LANDES, OF GEHMAN, PENNSYLVANIA.

AGRICULTURAL IMPLEMENT.

SPECIFICATION forming part of Letters Patent No. 354,324, dated December 14, 1886.

Application filed September 28, 1885. Serial No. 178,370. (No model.)

*To all whom it may concern:*

Be it known that I, JACOB M. LANDES, a citizen of the United States, residing at Gehman (Post-Office,) Montgomery county, Pennsylvania, have invented a certain Improved Agricultural Implement, of which the following is a specification.

The object of my invention is to construct an agricultural implement which may be used either as a harrow, a cultivator, a furrow-coverer, or a furrow-striker, and this object I attain in the manner which I will now proceed to describe, reference being had to the accompanying drawings, in which—

Figure 2:
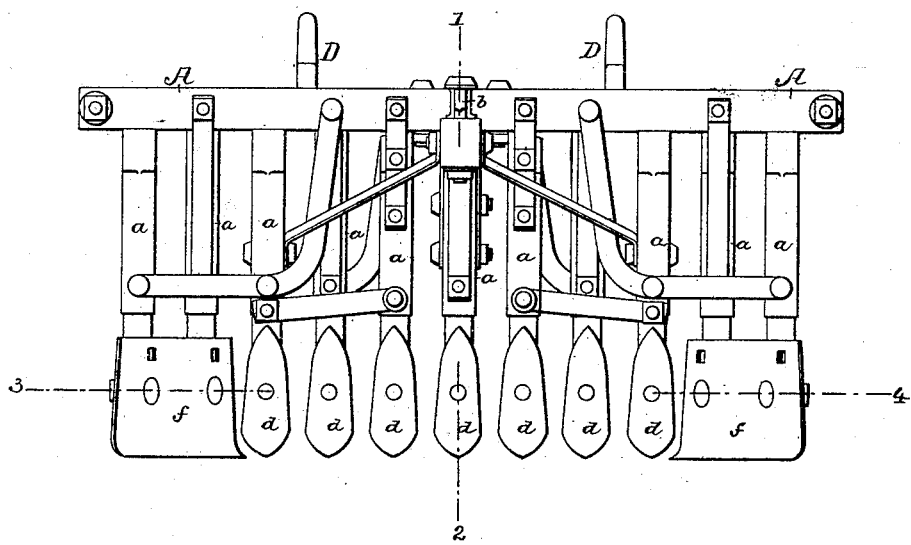
Figure 3:
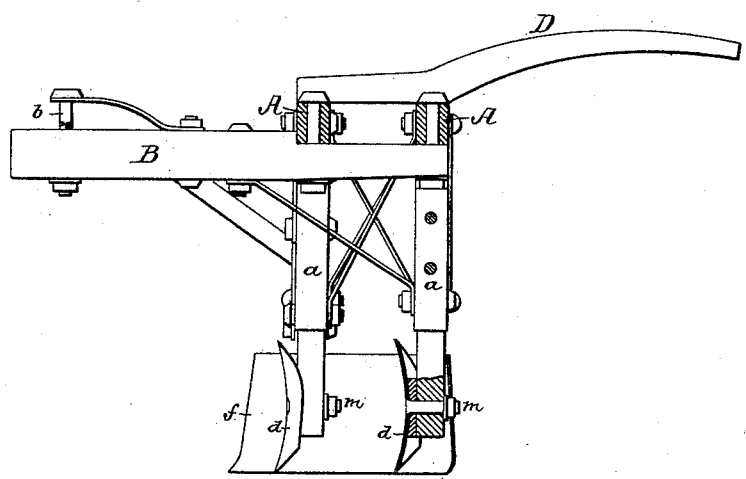

Figure 1 is a perspective view of my improved agricultural implement; Fig. 2, a front view of the same; Fig. 3, a longitudinal section on the line 1 2, Fig. 2; Fig. 4, a sectional plan on the line 3 4, Fig. 2, and Fig. 5 a view showing the blades arranged in a manner different from that shown in Fig. 4.

A is a rectangular frame, from which depend a series of posts, $a$, this frame having rearwardly-projecting guide-handles D, and being furnished with a projecting beam, B, having a bolt, $b$, to which the usual single-tree may be attached. The posts $a$ are arranged in two parallel rows, and are staggered in respect to each other—that is to say, the posts of the rear row are intermediate between the posts of the front row, the two posts in the center of the first row and the central post of the rear row being detachably secured to the frame A, so that they can be removed therefrom when occasion requires, the other posts being rigidly secured to the frame. Each of the detachable posts has near the lower end an opening for the reception of a bolt, $m$, whereby the blades $d$ may be secured to said posts, each of the permanent posts having near the lower end two openings, one of which is at an angle in respect to the other, so that each of said permanent posts may carry a blade, $d$; or a longer blade, $f$, may be secured to and carried by the front and rear posts. The blade $d$ has a sharp end and a blunt end, as shown in the front view, Fig. 2.

All of the posts of the machine are thoroughly braced, so that the structure is of a rigid character throughout, and yielding of the lower ends of the posts is prevented.

In using the above-described implement as a harrow, all of the posts are provided with the blades $d$, the pointed ends of said blades being down, when deep harrowing is to be performed and the blades being reversed when the harrowing is to be shallow.

When it is desired to use the machine as a cultivator or furrow-striker, the detachable posts $a$ may be removed, the permanent posts in this case each carrying a blade, $d$, if desired; or, in cultivating, the outer posts of each row may carry a long blade, $f$, as shown in Fig. 4; or two long blades may be used, as shown by dotted lines in said figure, the latter arrangement being also adopted when the device is to be used as a furrow-striker.

Each blade is provided with two bolt-holes near each end, one hole being above the other, so that the draft or depth of penetration of the blade depends upon which of the holes receives the bolt, whereby a deep or shallow furrow may be formed, as desired.

In cultivating, it is sometimes advisable to turn a deep furrow with the outer blades, $f$, and break up or pulverize the clods or lumps by means of blades $d$ on the next inner, front, and rear posts.

It will be noticed that the openings in each blade $f$ for the reception of the bolts $m$ are nearer one end of the blade than the other, so that when the blades are adjusted with the short projecting ends to the rear, as in Fig. 4, the furrows will be wider apart than when the blades have the long projecting ends to the rear, as in Fig. 5.

I claim as my invetionn—

1. The combination of the frame A with front and rear rows of depending legs for carrying the cultivator-blades, the outer legs of each row being rigidly secured to the frame and having means for adjusting the angles of the shovels or scrapers, but the inner or central legs of each row being detachable, all substantially as specified.

2. The combination of the frame having front and rear legs with blades alike at both ends, and having bolt-holes, one adjacent to one end of the blade and the other farther from the opposite end, whereby, on reversing the blades, the width of the furrow turned thereby will be changed, all substantially as specified.

In testimony whereof I have signed my name to this specification in the presence of two subscribing witnesses.

JACOB M. LANDES.

Witnesses:
MICHAEL B. BERGEY,
ISAAC S. BORNEMAN.